US 8,335,803 B2

(12) United States Patent
Abraham

(10) Patent No.: US 8,335,803 B2
(45) Date of Patent: Dec. 18, 2012

(54) HIERARCHICAL REPRESENTATION OF TIME-RELATED PROFILES

(75) Inventor: Manoj Abraham, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 12/834,752

(22) Filed: Jul. 12, 2010

(65) Prior Publication Data

US 2011/0087707 A1 Apr. 14, 2011

Related U.S. Application Data

(60) Provisional application No. 61/250,448, filed on Oct. 9, 2009.

(51) Int. Cl.
G06F 7/00 (2006.01)
G06F 17/30 (2006.01)
(52) U.S. Cl. ........................................................ 707/802
(58) Field of Classification Search ................... 707/802
See application file for complete search history.

(56) References Cited

U.S. PATENT DOCUMENTS

| | | | | | |
|---|---|---|---|---|---|
| 6,374,249 | B1 * | 4/2002 | Joslin et al. | ........................... | 1/1 |
| 7,383,284 | B2 * | 6/2008 | Heinrichs et al. | ..................... | 1/1 |
| 2001/0042059 | A1 * | 11/2001 | Uehara et al. | ..................... | 707/1 |
| 2002/0059272 | A1 * | 5/2002 | Porter | ........................... | 707/100 |
| 2002/0186702 | A1 * | 12/2002 | Ramos et al. | ................. | 370/410 |
| 2003/0208459 | A1 * | 11/2003 | Shea et al. | ......................... | 707/1 |
| 2004/0267694 | A1 * | 12/2004 | Sakai et al. | ........................ | 707/1 |
| 2005/0060300 | A1 * | 3/2005 | Stolte et al. | ....................... | 707/3 |
| 2006/0015377 | A1 * | 1/2006 | Hoogs et al. | ....................... | 705/7 |
| 2006/0080171 | A1 * | 4/2006 | Jardins et al. | .................. | 705/14 |
| 2006/0136309 | A1 * | 6/2006 | Horn et al. | ...................... | 705/26 |
| 2007/0255681 | A1 * | 11/2007 | Tien et al. | ......................... | 707/2 |
| 2008/0004740 | A1 * | 1/2008 | Tamarkin et al. | .............. | 700/106 |
| 2008/0120129 | A1 * | 5/2008 | Seubert et al. | .................... | 705/1 |
| 2008/0162480 | A1 * | 7/2008 | Clayton et al. | .................... | 707/8 |
| 2009/0113350 | A1 * | 4/2009 | Hibino et al. | ................. | 715/853 |
| 2009/0313193 | A1 * | 12/2009 | Hawkins et al. | ................ | 706/13 |
| 2010/0114818 | A1 * | 5/2010 | Lier et al. | ....................... | 707/613 |
| 2010/0153409 | A1 * | 6/2010 | Joshi et al. | ..................... | 707/758 |
| 2011/0078171 | A1 * | 3/2011 | Wagenblatt et al. | .......... | 707/769 |

OTHER PUBLICATIONS

Lecture Notes, "Augmented Search Trees", Fall Semester 2007, [online] [retrieved on Jul. 23, 2010], Retrieved from the Internet <URL: http://www.bowdoin.edu/~ltoma/teaching/cs231/fall07/Lectures/augtrees.pdf>.

Wikipedia.com, "Skip List", Sep. 8, 2005, [online] [retrieved on Jul. 23, 2010], Retrieved from the Internet <URL: http://en.wikipedia.org/wiki/Skip_list>.

* cited by examiner

*Primary Examiner* — Robert Beausoliel, Jr.
*Assistant Examiner* — Nicholas Allen
(74) *Attorney, Agent, or Firm* — Fliesler Meyer LLP

(57) ABSTRACT

Embodiments of the present invention include systems and methods for representing data in a hierarchy using a deterministic skip list data structure. In embodiments, a profile or profiles may be represented using a multi-level, time-based hierarchy using a deterministic skip list data structure comprised of nodes of local data values.

13 Claims, 14 Drawing Sheets

100

200

400

365

February 2

405 — Base: 90

410 — Min: -40

415 — Max: 110

| | 425 | 430 | 435 |
|---|---|---|---|
| | Time | Delta | Cumulative |
| | 9:00 AM | +10 | +10 |
| | 12:00 PM | -50 | -40 |
| | 4:00 PM | +100 | +60 |
| | 9:00 PM | +50 | +110 |
| 420 | 10:00 PM | -50 | +60 |

Find the node levels (e.g., year, month, week, and day) corresponding to the time *t* ⟵ 805

When inserting a time node (e.g., year, month, week, day, etc.), set the base for the node to be equal to the base of the first node of the same level that is greater than the inserted node ⟵ 810

FIGURE 8

| PROFILE | MIN | 0 | | |
|---|---|---|---|---|
| | MAX | 0 | | |
| YEAR | T | INF_PAST | | INF_FUTURE |
| | BASE | 0 | | 0 |
| | MIN | 0 | | 0 |
| | MAX | 0 | | 0 |
| MONTH | T | INF_PAST | | INF_FUTURE |
| | BASE | 0 | | 0 |
| | MIN | 0 | | 0 |
| | MAX | 0 | | 0 |
| DAY | T | INF_PAST | | INF_FUTURE |
| | BASE | 0 | | 0 |
| | MIN | 0 | | 0 |
| | MAX | 0 | | 0 |
| DELTA1 | T | | | |
| | DELTA | | | |
| | VALUE | | | |
| DELTA2 | T | | | |
| | DELTA | | | |
| | VALUE | | | |
| DELTA3 | T | | | |

Initial Profile Representation

FIGURE 9

| PROFILE | MIN | 0 | | | | | |
|---|---|---|---|---|---|---|---|
| | MAX | 100 | | | | | |
| YEAR | T | | INF_PAST | | 2009 | | INF_FUTURE |
| | BASE | | 0 | | 0 | | 0 |
| | MIN | | 0 | | 0 | | 0 |
| | MAX | | 0 | | 100 | | 100 |
| MONTH | T | | INF_PAST | | JAN | | INF_FUTURE |
| | BASE | | 0 | | 0 | | 0 |
| | MIN | | 0 | | 0 | | 0 |
| | MAX | | 0 | | 100 | | 0 |
| DAY | T | | INF_PAST | | 1 | | INF_FUTURE |
| | BASE | | 0 | | 0 | | 0 |
| | MIN | | 0 | | 0 | | 0 |
| | MAX | | 0 | | 100 | | 0 |
| DELTA1 | T | | | | 12 | | |
| | DELTA | | | | 100 | | |
| | VALUE | | | | 100 | | |
| DELTA2 | T | | | | | | |
| | DELTA | | | | | | |
| | VALUE | | | | | | |
| DELTA3 | T | | | | | | |

After Adding 100 on January 1, 2009 at 12 hours

FIGURE 10

| PROFILE | MIN | | 0 | | | |
|---|---|---|---|---|---|---|
| | MAX | | 100 | | | |
| YEAR | T | | INF_PAST | 2009 | 2011 | INF_FUTURE |
| | BASE | | 0 | 0 | 100 | 90 |
| | MIN | | 0 | 0 | -10 | 0 |
| | MAX | | 0 | 100 | 0 | 0 |
| MONTH | T | | INF_PAST | JAN | JAN | INF_FUTURE |
| | BASE | | 0 | 0 | 0 | 0 |
| | MIN | | 0 | 0 | -10 | 0 |
| | MAX | | 0 | 100 | 0 | 0 |
| DAY | T | | INF_PAST | 1 | 1 | INF_FUTURE |
| | BASE | | 0 | 0 | 0 | 0 |
| | MIN | | 0 | 0 | -10 | 0 |
| | MAX | | 0 | 100 | 0 | 0 |
| DELTA1 | T | | | 12 | 5 | |
| | DELTA | | | 100 | -10 | |
| | VALUE | | | 100 | -10 | |
| DELTA2 | T | | | | | |
| | DELTA | | | | | |
| | VALUE | | | | | |
| DELTA3 | T | | | | | |

After Adding -10 on January 1, 2011 at 5 hours

FIGURE 11

| | | INF_PAST | 2009 | | 2011 | INF_FUTURE |
|---|---|---|---|---|---|---|
| PROFILE | MIN | 0 | | | | |
| | MAX | 100 | | | | |
| YEAR | T | INF_PAST | 2009 | | 2011 | INF_FUTURE |
| | BASE | 0 | 0 | | 80 | 70 |
| | MIN | 0 | 0 | | -10 | 0 |
| | MAX | 0 | 100 | | 0 | 0 |
| MONTH | T | INF_PAST | JAN | MAR | JAN | INF_FUTURE |
| | BASE | 0 | 0 | 100 | 0 | 0 |
| | MIN | 0 | 0 | -20 | -10 | 0 |
| | MAX | 0 | 100 | 0 | 0 | 0 |
| DAY | T | INF_PAST | 1 | 1 | 23 | 1 | INF_FUTURE |
| | BASE | 0 | 0 | 0 | 0 | 0 | 0 |
| | MIN | 0 | 0 | 0 | -20 | -10 | 0 |
| | MAX | 0 | 100 | 0 | 0 | 0 | 0 |
| DELTA1 | T | | 12 | | 10 | 5 | |
| | DELTA | | 100 | | -20 | -10 | |
| | VALUE | | 100 | | 0 | -10 | |
| DELTA2 | T | | | | | | |
| | DELTA | | | | | | |
| | VALUE | | | | | | |
| DELTA3 | T | | | | | | |

After Adding -20 on March 23, 2009 at 10 hours

FIGURE 12

| PROFILE | MIN | 0 | | | | | | | | |
|---|---|---|---|---|---|---|---|---|---|---|
| | MAX | 100 | | | | | | | | |
| YEAR | T | | INF_PAST | 2009 | | | | 2011 | INF_FUTURE | |
| | BASE | | 0 | 0 | | | | 30 | 20 | |
| | MIN | | 0 | 0 | | | | -10 | 0 | |
| | MAX | | 0 | 100 | | | | 0 | 0 | |
| MONTH | T | | INF_PAST | JAN | FEB | | MAR | JAN | INF_FUTURE | |
| | BASE | | 0 | 0 | 100 | | 50 | 0 | 0 | |
| | MIN | | 0 | 0 | -50 | | -20 | -10 | 0 | |
| | MAX | | 0 | 100 | 0 | | 0 | 0 | 0 | |
| DAY | T | | INF_PAST | 1 | 1 | 17 | 1 | 23 | 1 | INF_FUTURE |
| | BASE | | 0 | 0 | 0 | 0 | 0 | 0 | 0 | 0 |
| | MIN | | 0 | 0 | 0 | -50 | 0 | -20 | -10 | 0 |
| | MAX | | 0 | 100 | 0 | 0 | 0 | 0 | 0 | 0 |
| DELTA1 | T | | | 12 | | 7 | | 10 | 5 | |
| | DELTA | | | 100 | | -50 | | -20 | -10 | |
| | VALUE | | | 100 | | -50 | | -20 | -10 | |
| DELTA2 | T | | | | | | | | | |
| | DELTA | | | | | | | | | |
| | VALUE | | | | | | | | | |
| DELTA3 | T | | | | | | | | | |

After Adding -50 on February 17, 2009 at 7 hours

FIGURE 13

| PROFILE | MIN | | | | | |
|---|---|---|---|---|---|---|
| | MAX | 0 | | | | |
| | | 100 | | | | |

| YEAR | T | INF_PAST | 2009 | | | 2011 | INF_FUTURE |
|---|---|---|---|---|---|---|---|
| | BASE | 0 | 0 | | | 40 | 20 |
| | MIN | 0 | 0 | | | -10 | 0 |
| | MAX | 0 | 100 | | | 0 | 0 |

| MONTH | T | INF_PAST | JAN | FEB | MAR | JAN | INF_FUTURE |
|---|---|---|---|---|---|---|---|
| | BASE | 0 | 0 | 100 | 50 | 0 | 0 |
| | MIN | 0 | 0 | -50 | -20 | -10 | 0 |
| | MAX | 0 | 100 | 0 | 10 | 0 | 0 |

| DAY | T | INF_PAST | 1 | 17 | 23 | 1 | INF_FUTURE |
|---|---|---|---|---|---|---|---|
| | BASE | 0 | 0 | 0 | 0 | 0 | 0 |
| | MIN | 0 | 0 | -50 | -20 | -10 | 0 |
| | MAX | 0 | 100 | 0 | 10 | 0 | 0 |

| DELTA1 | T | 12 | 7 | 10 | 5 |
|---|---|---|---|---|---|
| | DELTA | 100 | -50 | -20 | -10 |
| | VALUE | 100 | -50 | -20 | -10 |

| DELTA2 | T | 14 |
|---|---|---|
| | DELTA | 10 |
| | VALUE | -10 |

| DELTA3 | T | |
|---|---|---|

After Adding 10 on March 23, 2009 at 14 hours

FIGURE 14

HIERARCHICAL REPRESENTATION OF TIME-RELATED PROFILES

CROSS-REFERENCE TO RELATED APPLICATION

This application claims the priority benefit under 35 U.S.C. Section 119(e) of and commonly assigned U.S. Patent Application Ser. No. 61/250,448, entitled "Hierarchical Representation Of Time-Related Profiles," filed on Oct. 9, 2009, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

A. Technical Field

The present invention pertains generally to data processing, and relates more particularly to profile data structures.

B. Background of the Invention

Profiles have been used to represent time-related data. For example, profiles have been used to represent dynamic supply chain components, such as buffer plans and resource plans. Dynamic supply chain systems are useful tools to help plan materials/inventory, capacity (such as workforce and equipment availability), or both. These systems are beneficial because they can help address complex supply chain issues. However, planning typically involves extensive searching and updating of profiles. Because the profiles are frequently searched, frequently altered, or both, efficient profile representations are important to performance. Traditionally, time varying profiles, such as material profiles and capacity profiles, have been represented using one of two types of data structures: linear linked lists and binary trees.

Supply chain profile information is usually represented using linear linked list data structures. A linked list is a data structure formed of a linear sequence of data records. FIG. 1 graphically depicts the structure of a linked list. Each record or node contains a link or reference to the next record in the sequence. For example, in a supply chain, a set of linked records might represent the inventory of a material over a period of time. Each record might represent a day, the inventory level that day, and a link the next day's record. Although such data structures are simple to implement, they have some drawbacks. First, an alteration in one record creates a domino or cascading effect in which all of the subsequent records in the linked list must also be updated. For example, in FIG. 1, if Record 2 is updated, then Record 3 through Record n must also be updated. Although this is simple, it can be computationally expensive. Second, linked lists are not very efficient for searching. Typically, all or almost all of the records must be searched. For example, if a planner wants to know when an inventory level drops below a threshold level, all of the records will need to be searched. Thus, although a linear data structure can provide simplicity, it creates computational expense in both updating the data records and in searching the data records.

The other data structure approach for time-related profiles has been to use binary trees. FIG. 2 graphically depicts an example of a binary tree structure. Binary trees allows for search space pruning techniques that can be used by heuristics to quickly search by eliminating alternate paths. By way of comparison, linked lists have O(n) complexity, but binary search trees have O(log n) complexity. However, binary trees present a tradeoff. The increased searching ability comes at the cost of added complexity. This complexity is particularly acute when having to update the data. In order to maintain good searching characteristics, the binary tree must be rebalanced if nodes are added or deleted from the tree structure. Rebalancing can be complex and computationally expensive.

Thus, previous attempts to develop a hierarchy for time-related data have only yielded systems with notable drawbacks.

SUMMARY

Presented herein are systems and methods for hierarchical representation of time-related profiles. In embodiments, a profile or profiles may be represented using a multi-level, time-based hierarchy using a deterministic skip list data structure comprised of nodes of local data values.

Embodiments of the present invention include a data structure for representing a time-related profile of a resource as a hierarchy. The resource may be a material resource or a capacity resource. In embodiments, the data structure comprises an ordered set of nodes forming a hierarchy of temporal levels, wherein a temporal level comprises a set of nodes having a similar or same magnitude temporal span. Each of at least some of the nodes comprises a set of data fields for storing profile-related data, at least one a time span indicator, and up to four links comprising: a link to a temporally-immediate prior same-level node, a link to a temporally-immediate subsequent same-level node, a link to a next higher temporal level node having a time span that includes the node's time span, and a link to a next lower temporal level node having a time span that is included within the time span of the node. The lowest temporal level nodes comprises one or more material resource or capacity resource values.

In embodiments, the set of profile-related data of a node includes: a local maximum resource value representing the maximum increase value of the resource within the time span of the node, a local minimum resource value representing the minimum increase (or maximum decrease) value of the resource within the time span of the node, and a base resource value representing an initial value of the resource at the start of the time span of the node. In embodiments, the resource values of the lowest temporal level nodes includes a resource change value and a time value associated with the resource change value. The lowest temporal level nodes may also include cumulative resource changes during the time span of the node.

In embodiments, the profile represents capacities of a resource or resources for spans of time and the set of data fields for storing profile-related data for at least some of the nodes that form a lowest temporal level further comprises at least one data value representing a boundary of a span of time. In embodiments, the boundary may represented by a start boundary, by an end boundary, or by both.

One skilled in the art shall recognize that the data structure may be used with various methods including searching for values or limits, updating values (including adding new values, deleting values, or modifying existing values), etc. The methods may be contained in a computer program product comprising at least one computer-readable medium storing one or more sequences of instructions, wherein execution of the one or more sequences of instructions by one or more processors causes the one or more processors to execute a computer-implemented method or methods. Embodiments of the present invention include a computer system or systems for hierarchical representation of time-related profiles and for performing one or more of the methods disclosed herein.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4 depicts an example of data associated with a daily node according to embodiments of the present invention.

FIG. 8 depicts a method for inserting a node according to embodiments of the present invention.

FIG. 9 depicts an example of an initial profile representation according to embodiments of the present invention.

FIG. 10 depicts the hierarchical data structure after adding a data point according to embodiments of the present invention.

FIG. 11 depicts the hierarchical data structure after adding another data point according to embodiments of the present invention.

FIG. 12 depicts the hierarchical data structure after adding another data point according to embodiments of the present invention.

FIG. 13 depicts the hierarchical data structure after adding another data point according to embodiments of the present invention.

FIG. 14 depicts the hierarchical data structure after adding another data point according to embodiments of the present invention.

DETAILED DESCRIPTION OF THE PREFERRED EMBODIMENTS

Figure 1:
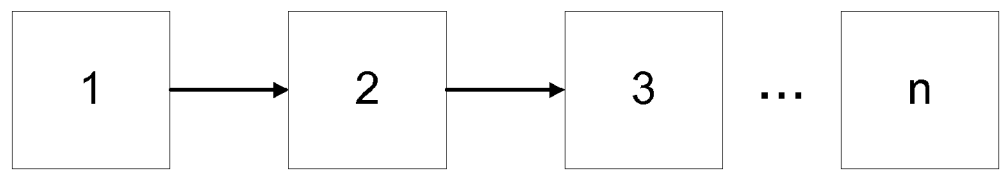
FIG. 1 graphically depicts the structure of a linked list.
Figure 2:
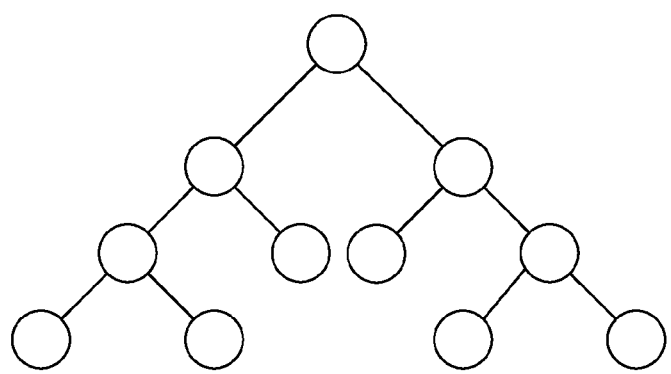
FIG. 2 graphically depicts an example of a binary tree structure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" or "function" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

Embodiments of the present invention presented herein will be described using supply chain planning examples. These examples are provided by way of illustration and not by way of limitation. It shall be noted that the present invention may be used in connection with supply chain planning, order planning, scheduling, inventory planning, project management, and the like. Furthermore, one skilled in the art shall also recognize the general applicability of the present invention to other applications as well.

A. Overview

Traditionally, linked lists and balanced binary trees are used for representing and searching time-varying profiles. These prior methods do not take advantage of the typical time horizon and the natural hierarchy of time. The systems and methods presented herein take advantage of the fact that the time horizon for most time-based problems is typically only between a few months to a few years. Furthermore, the systems and methods presented herein utilize the natural hierarchy of time, namely year, month, week, day, etc. The systems and methods presented herein allow for the searching of profiles, such as material and capacity profiles in constant time (that is, the number of searches is fixed in the worst case). Overall the systems and methods yield better speed and simplicity over prior solutions.

B. Hierarchical Data Structure

A profile can be represented as a hierarchy. For a time-based profile, a top-level profile may be comprised of sets of lower-level profiles or nodes. For example, in embodiments, a profile is a list or set of yearly profiles. A yearly profile is a set of monthly profiles. A monthly profile is a set of weekly profiles. A weekly profile is a set of daily profiles, and so forth to the desired time increment. In embodiments, the bottom-most level comprises data used to generate a daily profile. For example, in embodiments, if the lowest level, or base level, is a daily level, the daily profile may comprise one or more data points about a characteristic of an item of interest (e.g., a set of data points in time giving the consumptions and productions of a product at those times). It should be noted that the examples presented herein will have a year level, month level, week level, and daily level; however, more, fewer, or different levels may be used. It should be noted that, in embodiments, at each level the nodes have the same or similar temporal spans. For example, the nodes at the week level each represent a seven-day time span.

Figure 3:
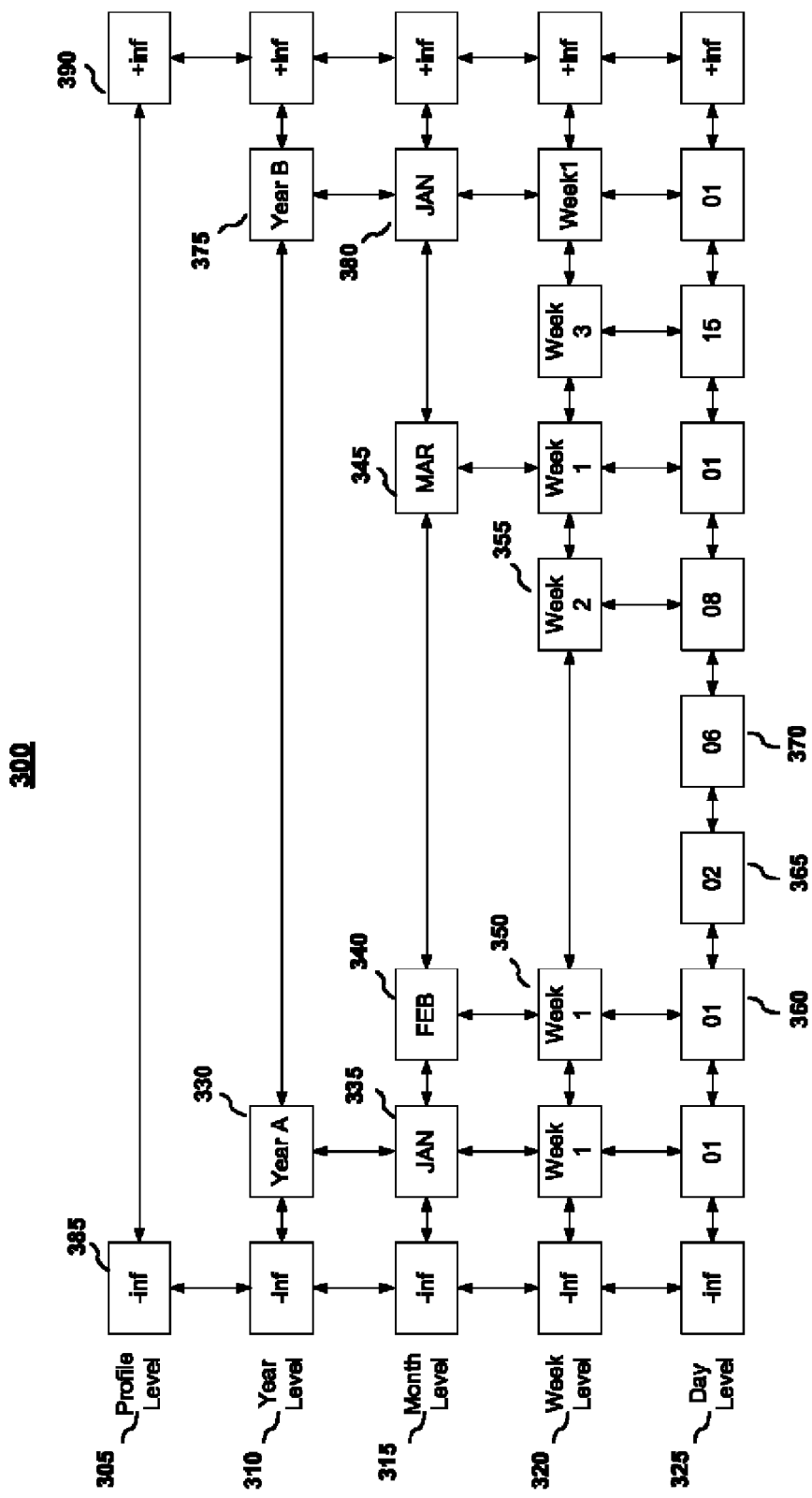
FIG. 3 depicts a graphical representation of an example of a deterministic skip list data structure used to represent a time hierarchy according to embodiments of the present invention.

In embodiments, a deterministic skip list data structure may be used to represent this hierarchy. A skip list is a list-like data structure where nodes can have more than one next pointer. For example, a year node can have a pointer to the next year node in the list skipping over all the nodes in the current year. In embodiments, the skip list may be implemented using quad nodes, which have up to four links— above and below pointers in addition to the next and previous pointers. FIG. 3 graphically depicts an embodiment of a hierarchy with quad nodes.

FIG. 3 depicts a graphical representation of an example of a deterministic skip list data structure used to represent a time hierarchy according to embodiments of the present invention. As shown in FIG. 3, a profile 305 is a list of yearly profiles 310. A yearly profile 310 (e.g., Year A 330) is a set of monthly profiles (e.g., January 335, February 340, and March 345). A monthly profile 315 (e.g., February 340) is a set of weekly profiles (e.g., Week 1 350 and Week 2 355). A weekly profile 320 (e.g., Week 1 350) is a set of daily profiles (e.g., February 1 360, February 2 365, and February 6 370). It should be noted that, in embodiments, like-level nodes do not have to have the same number of lower-level nodes. For example, Year A 330 comprises three month nodes, namely January 335, February 340, and March 345, but Year B 375 only has one month node, namely January 380.

In embodiments, the deterministic skip list data structure includes boundary entry nodes, denoted −infinity 385 and +infinity 390 in FIG. 3. In embodiments, if a user sets an initial profile date, the start date (−infinity) may be a user-defined or default amount of time prior to that initial date, and the end date (+infinity) may be a user-defined or default amount of time after that initial date. In embodiments, the start date (−infinity) is three years before the initial date and the end date (+infinity) is three years after the initial start date. It shall be noted that the start and end date information is a matter of implementation. One skilled in the art shall recognize that other implementation may be used.

Each node may maintain profile-related data that is useful for searching. For example, in embodiments, each node in the hierarchy maintains a base value, local minimum value, and a local maximum value. These minimum and maximum values can be used to prune the search space. For example, if a user wants to know every day that had an inventory level below a certain value, if the minimum in a month is more that the value being searched for, that month can be skipped. In the best case, if the value being searched for is more than the minimum in the profile, the system can return a result (i.e., that there are no days below the searched-for minimum value) without searching through the nodes.

In embodiments, additional or fewer data fields may be included with nodes. For example, in embodiments, the bottom-most level may comprise a set of profile changes, or "deltas." Consider by way of illustration and not limitation, the data illustrated in FIG. 4 for a daily node.

FIG. 4 depicts an example of data associated with a daily node according to embodiments of the present invention. In the depicted example, the day level node 365 maintains a base value 405, a local minimum value 410, a local maximum value 415, and daily profile information comprising a list of points 420 in time 425 with the changes (consumptions and productions) 430 at those times. The daily node 365 may also include a cumulative change listing 435. Note that in the depicted example, the minimum 410 is −40 units and the maximum 415 is +110 units.

It should be noted that a benefit of using a base value and local minimum and local maximum helps localize changes. Because nodes are local and obtain the profile amount by adding higher level amounts to the node amount, a change to the data structure (by changing a value, adding or subtracting a data point in a daily listing, and/or adding or subtracting a node or set of notes) does not require changing all of the subsequent nodes as in a linked list data structures and does not require rebalancing as in balanced tree data structures. If a value is changed, the daily node is updated as well as bases for all future days in the current week, bases for all future weeks in the current month, bases for all future months in the current year, and bases for all future years in current profile. Similarly since local minimum and local maximums are maintained, changes will be propagated up the hierarchy only and not to each node. For example, if a node value in a day changes, the day's local minimum might change; this in turn might change the local minimum for the week of that day, for the month of that week, for the year of that month, and to the local minimum of the profile. It will not change the local minimums of other nodes.

C. Exemplary Embodiments

Provided below are exemplary embodiments of a hierarchical profile of a resource (which may be a material resource or capacity resource) using deterministic skip list data structures. The exemplary embodiments include implementation information, which is provided by way of example and not limitation. Accordingly, it shall be noted that implementation details are a matter of choice and that other implementations may be used. Thus, implementation details that are a matter of choice or that do not materially alter application of a hierarchical profile using deterministic skip list data structures shall not limit the scope of the present invention.

1. Classes a) HProfile

In embodiments, HProfile, is a class, which may be a java class, used to represent material and resource profiles, and HProfile uses Date, ProfilePoint, DailyProfilePoint and ProfileDelta classes for its implementation. All of these classes are described in detail below.

HProfile class may be used to represent material and/or capacity profiles. HProfile uses a hierarchical representation for better performance than linear profile representations. In embodiments, HProfile uses a 4-level deterministic skip list. The levels are predetermined by year, month, week, and day. One skilled in the art shall recognize that different number of levels may be used. In embodiments, the expected number of elements for a level may be uniform. For example, in embodiments, all months may be expected to have 4 weeks or 28 days.

In embodiments, the HProfile comprises a number of data elements: base, minimum, and maximum. The base value (base_) represents the base or initial value or value at start of the profile. The minimum value (min_) represents the minimum shift from the base for the profile. The minimum value (min_) represents the maximum shift from the base for the profile. In the described implementation, the profile may comprise a yearly ProfilePoint, which is the head of the skip list implementation b) Date In embodiments, Date is a utility class to represent date and time efficiently for planning. In embodiments, dates may be represented as offsets (timesteps) from a base date (base_date) and a base time (base_time). A benefit of representing dates as offset is that instances can use an integer to represent dates. Typical, planning horizons are relatively short (from less than a year to a few years), so integer values can safely represent offsets from the base date. In embodiments, before creating instances of the date class, the base date and base time are initialized and it is from these initialize values that all offsets are computed.

For example, assume, for purposes of explanation, a planning horizon start of Jun. 10, 2007. The Date class is initialized with this date; hence, a value of 0 represents this date. In embodiments, the increment resolution might be minutes (although other increment values may be used), a value of 1440 (that is, the number of minutes since the base date) would represent the base date plus one day or Jun. 11, 2007. Similarly, a value of −1440 would represent Jun. 9, 2007.

c) ProfilePoint

Profiles are represented in a hierarchy using a deterministic skip list data structure. In embodiments, ProfilePoint represents a skip list node. A node may be a quad node that has pointers to nodes above (if any), below (if any), before (if any) and after (if any). Each ProfilePoint has information about a date time ("datetime") range, which range may be level specific. For example, in embodiments, the time range is dependent on the level. Yearly nodes represent a time range for that year (i.e., startkey=start of the year and endkey=end of the year.) Similarly, monthly nodes represent a time range of a month (i.e., startkey=start of the month and endkey=end of the month), and daily nodes represent a time range of a day (i.e., starKey=start of the day and endKey=end of the day). "startKey" represents the time corresponding to the start of this range and "endKey" represents the time corresponding to the end of this range. Each ProfilePoint also stores a base value ("Base"), a minimum value ("Min"), and a maximum value ("Max") for its date time range. In embodiments, the Min, Max, and Base values stored in a ProfilePoint node are local to the node. Information from higher level nodes is used to compute the actual global values of minimum, maximum, and base.

d) DailyProfilePoint

In embodiments, DailyProfilePoint class extends the ProfilePoint class. In embodiments, instances of the DailyProfilePoint class represent daily nodes. In embodiments, the daily nodes maintain a list of ProfileDelta objects, which comprise deltas, or changes, that occur during the time span that the daily node represents. Each delta represents an instant in time (typically minute level granularity but other levels of temporal granularity may be used) during the day when a profile change has taken place. In embodiments in which the classes are implemented using object oriented programming where there is inheritance, it overrides the various methods in the parent ProfilePoint class since the DailyProfilePoint is a subclass of ProfilePoint.

e) ProfileDelta

As noted above, in embodiments, the ProfileDelta class is used in the DailyProfilePoint class. These classes may be used to represent material and capacity profiles during planning or other operations. In embodiments, the ProfileDelta class is used to record values and changes in value at an instance in time. The ProfileDelta class keeps track of the Time, Delta, Value, and Override. Time is the instant of time at which there is a profile change. In embodiments, the time value is the actual timestep value as used in the Date class (i.e., it is not an offset from the start of the day but instead the actual value of time instant). Delta is the actual net change at that time. Value is the cumulative change up to and including that time.

Overrides are used to denote capacity bucket boundaries. Capacity profiles are very similar to material profile; however, there are some differences. In embodiments, capacity "buckets" cover a time span. One way to represent these "buckets" is by specifying the start of a bucket ("bucket_start") and a bucket end ("bucket_end"). Alternatively, a bucket may be specified by setting a bucket start and inferring the bucket's end by the start of the next bucket.

In embodiments, another difference between capacity buckets and material/inventory profiles is that the addition or consumption at any time within a bucket changes the level for the entire bucket. Thus, any changes within a bucket will change the value of the bucket_start node and will not be propagated to the next buckets. Thus, in embodiments, how the buckets in capacity profiles are constructed and initialized, and how capacity buckets are added, is different than with material/inventory profiles and capacity profiles. Because the capacity of a bucket is independent from prior buckets, changes to capacity buckets in a data structure are easier to maintain.

2. Operations

One significant benefit of a hierarchy using a deterministic skip list data structure as discussed herein is that operations can be performed on the data structure and those operations can be performed quickly and accurately. Because profiles can have significant amounts of data and because dealing with profiles can involve numerous operations, the speed at which the data structure can have operations performed upon it, such as changing values, searching, etc., can be important for users and for user satisfaction. Presented below are some exemplary embodiments of methods that may be performed on a hierarchical profile using deterministic skip list data structures. The exemplary embodiments include implementation information, which is provided by way of example and not limitation. Accordingly, it shall be noted that implementation details are a matter of choice and that other implementations may be used. Thus, implementations details that are a matter of choice or that do not materially alter application of a hierarchical profile using deterministic skip list data structures shall not limit the scope of the present invention.

a) Changing One or More Data Values in the Profile

A user may want to change one or more data values in a profile. Presented herein is an embodiment of a change methodology for the data structure. In embodiments, an HProfile change function that receives a inputs the change time (t) and the change amount (delta) can affect a change to the profile by performing the steps set forth in FIG. 5.

Figure 5:
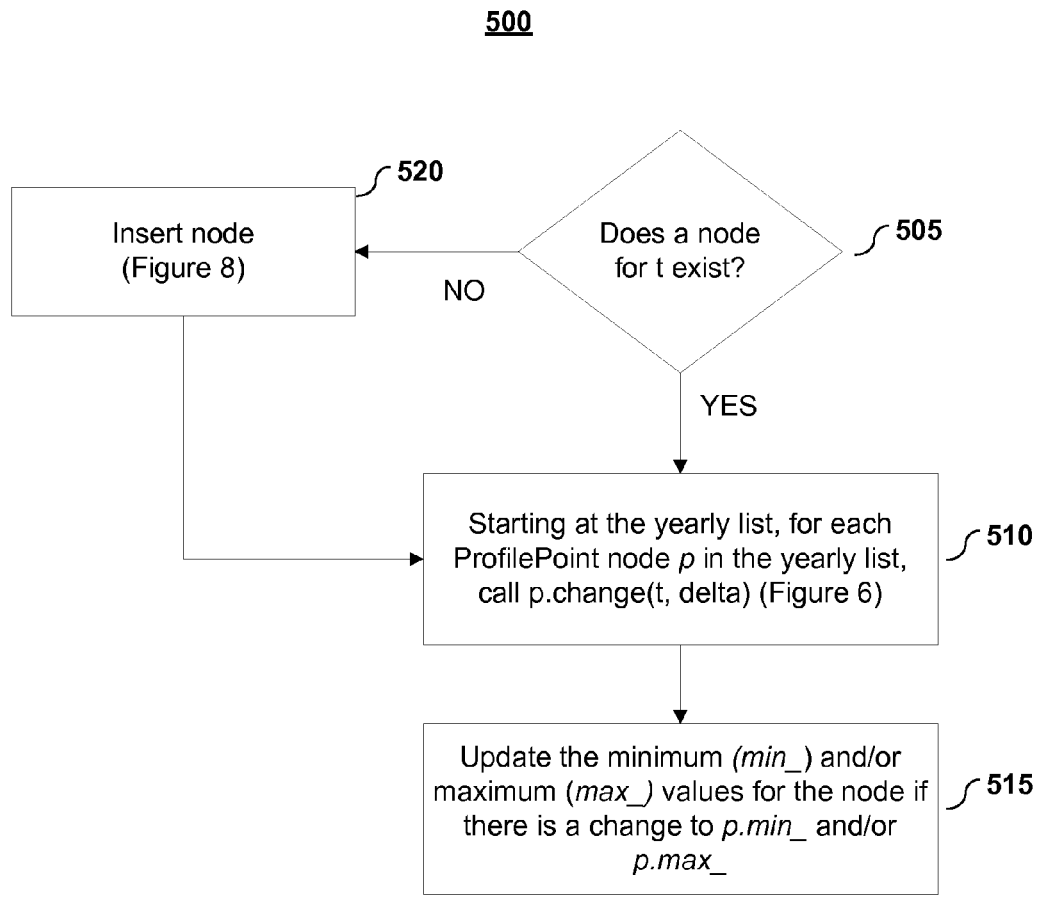
FIG. 5 depicts a method for updating a profile based upon a change according to embodiments of the present invention.

FIG. 5 depicts a method for updating a profile based upon a change according to embodiments of the present invention. Given the inputs of the time (t) that the change occurs and the change amount (delta), in embodiments, the method 500 commences by examining 505 whether a node in the profile exists to receive the change. If there is not a node in the profile for time t for a data point, then a node is inserted 520 to receive the change (delta) at time t. In embodiments, a node may be inserted according to the method depicted in FIG. 8, which is discussed in more detail below; although one skilled in the art shall recognize that other methods for inserting a node into the profile may be used.

Given a node for the change, in embodiments, the process to change (add, remove, or modify) a value starts at the yearly list. In embodiment, for each ProfilePoint node p in the yearly list, a ProfilePoint change(t, delta) function is called, where t is the time of the change (delta). An embodiment of this change function is described with reference to FIG. 6. Following operation of the change function, the minimum and/or maximum values for the profile are updated, if needed, based on the values of ProfilePoint minimum (p.min_) or ProfilePoint maximum (p.max_).

Figure 6:
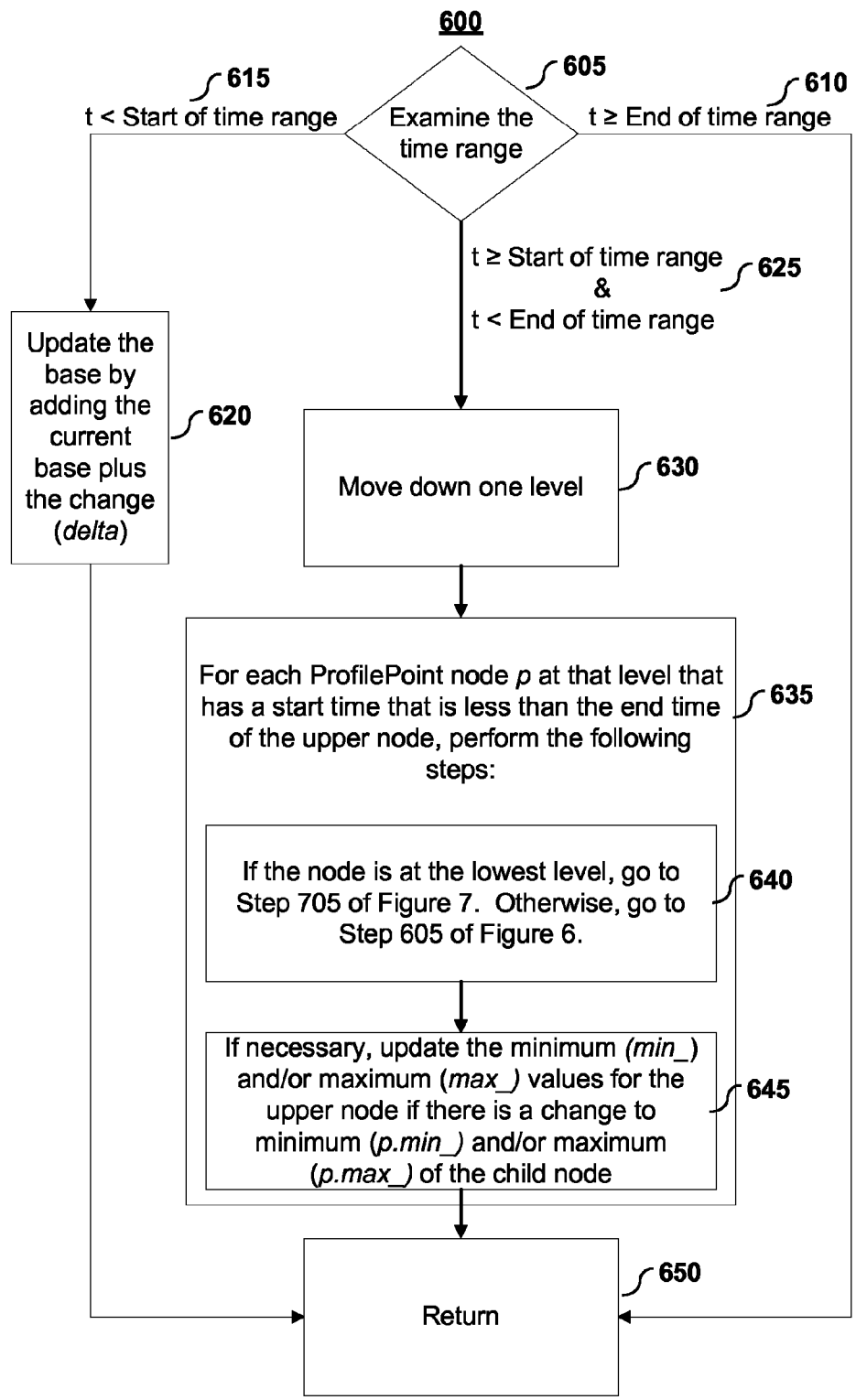
FIG. 6 depicts a method for updating one or more profile nodes according to embodiments of the present invention.

FIG. 6 depicts a method for updating one or more profile nodes according to embodiments of the present invention, which method may be performed by a ProfilePoint change function. Given the inputs of the time (t) that the change occurs and the change amount (delta), in embodiments, the method 600 commences by examining (605) the time range of a node (i.e., the time span covered between the start and end times of a node). If the time t is (610) greater than or equal to the end of the range (endKey) for that node (i.e., t is after the end of the node's time range), the change (delta) does not affect that node's value or that of its child nodes, so the process returns (650).

If the time t is (615) less than the start of the range (startKey) for that node (i.e., t is before the start of the node's time range), the change only affects the node's base value. Therefore, the node's base value is set (620) to its current base plus the change (i.e., delta), and the process returns (650).

If the time t is (625) within the node's time range (i.e., t>=startKey and t<endKey), the process moves (630) one level down in the profile data structure and performs the following steps for each ProfilePoint p node at that level that has a start time range (startKey) that is less than this upper nodes's end time (endKey). For those nodes that met that time criterion, the change function (p.change(t, delta)) is called (640). If the node is the lowest level of the profile, the change function is that described with reference to FIG. 7; otherwise, the process recursively starts at step 605 with the node under examination being a lower-level node that satisfied the time criterion but that is not the lowest-level node. The upper node's maximum and/or minimum values are updated (645), if needed, based on a new minimum value (p.min_) and/or a new maximum value (p.max_) for a child node. That is, if the change has caused a child node to have new maximum or a new minimum value, the upper level's value may also need to change. However, it should be noted that a new maximum or a new minimum value for a child node does not necessarily require a change to the max/min values at the upper, or parent, node because another child node for that parent node might have a lower minimum or a higher maximum than the new value for the child node. Thus, as would be apparent to one skilled in the art, the upper node's maximum and/or minimum values only change when a change to a child node's maximum and/or minimum values results in the child node having a maximum value or a minimum value that is either more than (in the case of maximum value) or less than (in the case of minimum value) of the parent's corresponding max/min value.

Figure 7:
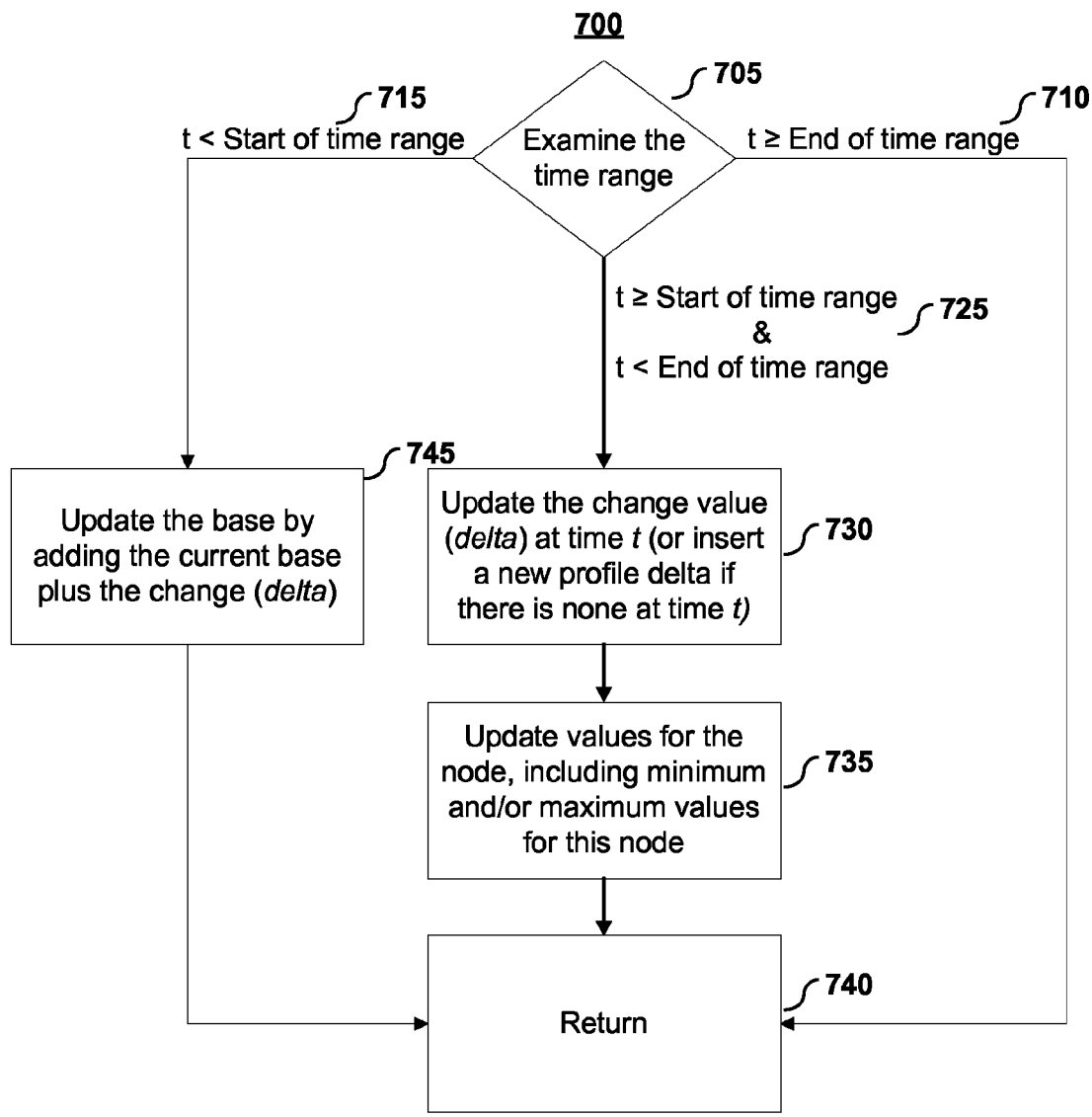
FIG. 7 depicts a method for updating a node based upon a change according to embodiments of the present invention.

FIG. 7 depicts a method for updating a lowest-level node based upon a change according to embodiments of the present invention. Consider the following example for purposes of illustration. If an upper node is a weekly level node, when the change process moves down one level (Step 630 of FIG. 6) to the daily level (the bottom level in this example) and calls the ProfilePoint function (p.change(t, delta)), it calls a DailyProfilePoint change function. In embodiments, a DailyProfilePoint change function may perform the following steps.

Given the inputs of the time (t) that the change occurs and the change amount (delta), in embodiments, the method 700 commences by examining (705) the time range. If the time t is (710) greater than or equal to the end of the range (endKey) for that node (i.e., t is after the end of the node's time range), the change (delta) does not affect that node's value, so the process returns (740).

If the time t is (715) less than the start of the range (startKey) for that node (i.e., t is before the start of the node's time range), the change only affects the node's base value. Therefore, the node's base value is set (745) to its current base plus the change (i.e., delta), and the process returns (740).

If the time t is (725) within the node's time range (i.e., t>=startKey and t<endKey), then the following steps are performed: (1) update the change value (delta) at time t, which may include inserting a new profile delta if there is none at time t, and (2) update the values for the node, which may include recomputing the minimum and maximum for this node, and (3) return (740).

b) Inserting a Node in the Profile

FIG. 8 depicts a method for inserting a node according to embodiments of the present invention. In the embodiment depicted in FIG. 8, the method 800 commences by finding (805) the node levels (i.e., the year, month, week and day nodes levels) corresponding to the time t. When inserting a node (e.g., year, month, week, day, etc.) in the profile, the base for the node is set to be equal to the base of the first node at the same level that is greater than the inserted node. For example, when inserting a year, the base for the year is set equal to the cumulative base of the first yearly node after that year. Similarly when inserting a month, the base for the month is set such that the value at the inserted month node is the same cumulative base value as the first monthly node that after that month. This is the same for other nodes, such as weekly nodes and daily nodes. Any changes in material/inventory level as a result of the insert may be adjusted as discussed herein.

c) Examples

FIGS. 9-14 depict some examples of changes and inserts to a material profile according to embodiments of the present invention. FIG. 9 depicts an example of an initial profile representation. The values are initialized to zero and there are no nodes added other than the boundary nodes of −infinity and +infinity. It should also be noted that in this example there is no week level in the hierarchy.

FIG. 10 depicts the hierarchical data structure after adding a data point according to embodiments of the present invention. In the depicted example, 100 units are added on Jan. 1, 2009 at 12:00 PM. Because the node does not exist, the node is added. For the daily node to be added, the upper nodes (month and year) are added in order to establish the hierarchy. Recorded in the day node is the first change (Delta 1) that shows at 12 hours, 100 units were added. Note that the profile maximum is updated and the infinity_future base value was increased by 100.

FIG. 11 depicts the hierarchical data structure after adding another a data point according to embodiments of the present invention. In the depicted example, 10 units are removed on Jan. 1, 2011 at 5 hours. Note that the added year receives its base from inf_future (100 units) before the change. The daily node is added and the data structure is updated, including updating the maximum and minimum values.

FIG. 12 depicts the hierarchical data structure after adding another data point according to embodiments of the present invention. In the depicted example, 10 units are removed on Mar. 23, 2009, at 10 hours. Note that the year node already exists, so only the month and day nodes are generated. The daily node is added and the data structure is updated, including updating the maximum and minimum values.

FIG. 13 depicts the hierarchical data structure after adding another data point according to embodiments of the present invention. In the depicted example, 50 units are removed on Feb. 17, 2009, at 7 hours. Note that the year node already exists, so only the month and day nodes are generated. The daily node is added and the data structure is updated, including updating the maximum and minimum values.

FIG. 14 depicts the hierarchical data structure after adding another data point according to embodiments of the present invention. In the depicted example, 10 units are added on Mar. 23, 2009, at 14 hours. All the nodes already exist in the data structure. The material profile data is added as Delta 2 to the Mar. 23, 2009 daily node, and the data structure is updated, including updating the maximum and minimum values.

d) Profile-Specific Operations

As noted previously, the unique hierarchical profile data structure makes performing operations more efficient than prior data structure implementations. Presented below are additional functions that can be performed that are specific to the type of profile, namely materials profiles and bucketed (capacity) profiles, which were discussed above.

(i) Material Profile Abstract Data Type (ADT) Operations

In embodiments, an abstract data type that is used to represent material profile may provide the following member functions. As discussed above, a change function can alter the value of the profile at time t by a quantity value. This function is used to add material to a profile or to remove material from a profile at a certain time. In embodiments, supplies will produce material into a buffer and demand will consume material from a buffer.

In embodiments, the profile can be searched to determine the value of the profile at a certain time t. This function may be used, for example, to obtain how much inventory is on-hand at a certain time. Given the set data structure, locating the value at the inputted time can be performed quickly.

In embodiments, maximum and or minimum values for a time period can also quickly be ascertained because the nodes record these values. Thus, for example, the minimum value in the time range [start, end] can be ascertained by examining the node or nodes that span the time range. Such functions may be used to find the available quantity in a buffer. In embodiments, the available quantity in a buffer at time t is the minimum value from time t until the end of the time horizon. In embodiments, the available quantity may be the amount that can be consumed at time t without creating a negative amount on-hand in the buffer.

In embodiments, the profile may be forward searched or backward searched for specified quantity levels. For example, in embodiments, a forward search function may search forward starting at a selected time "start" and finds the first point in time on or after this start time where the on-hand value is less than a user-specified limit. In embodiments, the function returns "true" if such a point exists in the range [start, end]. It returns "false" if no point in the profile satisfies the search condition. In embodiments, when the function returns "true," the point in time that satisfies the condition may be returned. In embodiments, relation types, such as == (equal to), > (greater than), >= (greater than or equal to), < (less than), <= (less than or equal to), may be used.

In embodiments, a backward search function searches backward starting at time "end" and finds the first point in time on or before end where the on-hand value is less than a specified limit. In embodiments, the function returns "true" if such a point exists in the range [start, end]. The function returns "false" if no point in the profile satisfies the search condition. In embodiments, when it return "true," the point in time that satisfies the condition is returned. In embodiments, relation types, such as == (equal to), > (greater than), >= (greater than or equal to), < (less than), <= (less than or equal to), may be used.

Presented above were some examples of operations that may be beneficially implemented using the data structure presented herein. These operations were presented by way of example and not limitation. Those skilled in the art shall recognize that these operations may be implemented in different ways and that other operations may also be implemented.

(ii) Bucketed Resource Profile Abstract Data Type (ADT)

Bucketed Resource Profiles are similar to material profiles. In embodiments, because Bucketed Resource Profiles are similar to material profiles, certain operations are the same. For example, finding the value at a specified time, finding the minimum or maximum value at a time or in a time span, forward searching, and backward searching may be the same as in the material profile discussed above. However, because some differences between material profiles and capacity or bucketed resource profiles do exist, other operations may be used. These other functions are described in more detail below.

In embodiments, as previously discussed, an override function may be used to create and initialize the buckets. A user may specify the start of the bucket and its initial capacity. In embodiments, buckets extend from start until the start of the next bucket. Alternatively, the buckets may be defined by a start and stop time interval. Buckets may be of any size and each bucket may be of a different size. For example, a profile may have daily buckets for the first 30 days, weekly buckets for the next 3 months, and monthly buckets for the rest of the year. Furthermore, a user may also model zero capacity. For example, a user may model zero capacity on Saturday and Sunday and weekly capacity in a Monday-Friday bucket.

In embodiments, once all the capacity buckets have been specified and initialized using the override function, the minimum and maximum values may be precomputed for efficient searching in the future.

In embodiments, a changeOverride function may be used to consume or add capacity at time t. In embodiments, this function will consume or add to the start of the bucket within which time t falls.

D. Computing System Implementations

In embodiments, a computing system may be configured to perform one or more of the methods, functions, and/or operations presented herein. Systems that implement at least one or more of the methods, functions, and/or operations described herein may comprise a time-related profile application operating on a computer system. The computer system may comprise one or more computers and one or more databases. In embodiments, the application may be part a network or may be a standalone device. In embodiments, the computer system may graphically depict profile information.

It shall be noted that the present invention may be implemented in any instruction-execution/computing device or system capable of processing data. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 15:
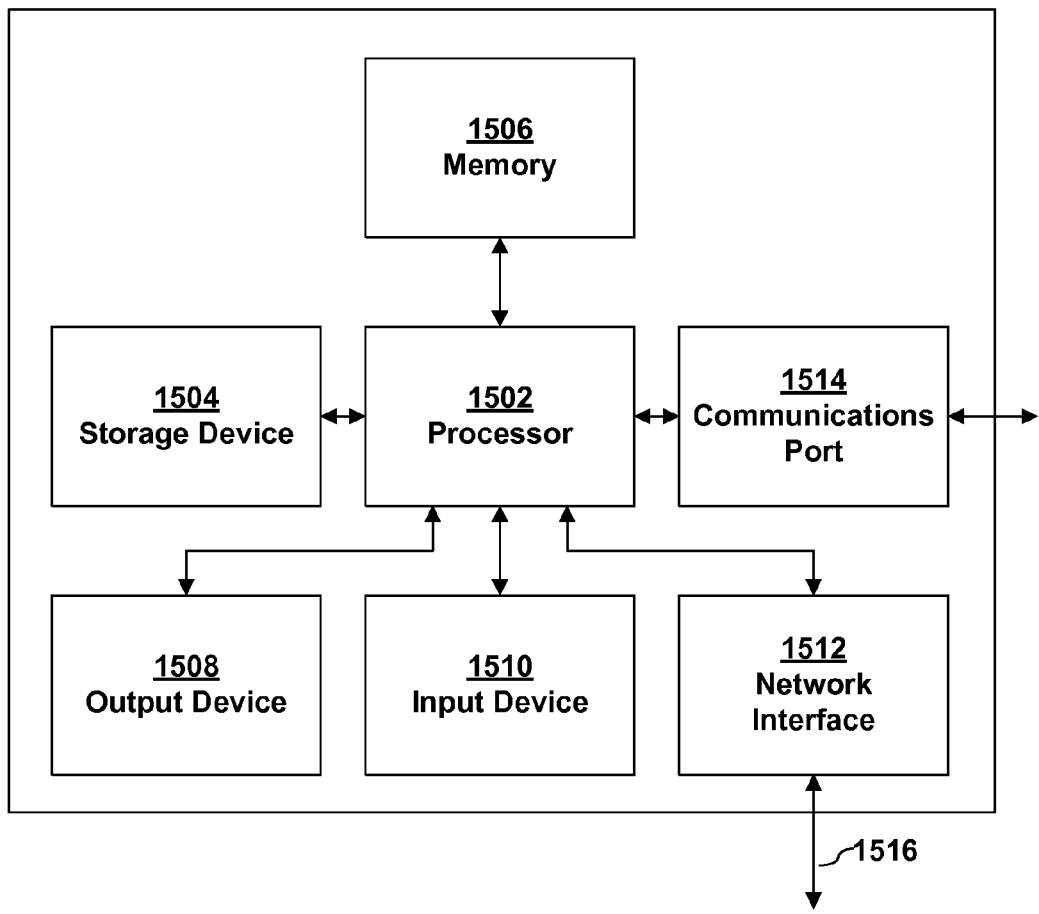
FIG. 15 depicts a block diagram of an example of a computing system according to embodiments of the present invention.

FIG. 15 depicts a functional block diagram of an embodiment of an instruction-execution/computing device 1500 that may implement or embody embodiments of the present invention. As illustrated in FIG. 15, a processor 1502 executes software instructions and interacts with other system components. In an embodiment, processor 1502 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1504, coupled to processor 1502, provides long-term storage of data and software programs. Storage device 1504 may be a hard disk drive and/or another device capable of storing data, such as a magnetic or optical media (e.g., diskettes, tapes, compact disk, DVD, and the like) drive or a solid-state memory device. Storage device 1504 may hold programs, instructions, and/or data for use with processor 1502. In an embodiment, programs or instructions stored on or loaded from storage device 1504 may be loaded into memory 1506 and executed by processor 1502. In an embodiment, storage device 1504 holds programs or instructions for implementing an operating system on processor 1502. In one embodiment, possible operating systems include, but are not limited to, UNIX, AIX, LINUX, Microsoft Windows, and the Apple MAC OS. In embodiments, the operating system executes on, and controls the operation of, the computing system 1500.

An addressable memory 1506, coupled to processor 1502, may be used to store data and software instructions to be executed by processor 1502. Memory 1506 may be, for example, firmware, read only memory (ROM), flash memory, non-volatile random access memory (NVRAM), random access memory (RAM), or any combination thereof. In one embodiment, memory 1506 stores a number of software objects, otherwise known as services, utilities, components, or modules. One skilled in the art will also recognize that storage 1504 and memory 1506 may be the same items and function in both capacities. In an embodiment, one or more of the methods, functions, or operations discussed herein may be implemented as modules stored in memory 1504, 1506 and executed by processor 1502.

In an embodiment, computing system 1500 provides the ability to communicate with other devices, other networks, or both. Computing system 1500 may include one or more network interfaces or adapters 1512, 1514 to communicatively couple computing system 1500 to other networks and devices. For example, computing system 1500 may include a network interface 1512, a communications port 1514, or both, each of which are communicatively coupled to processor 1502, and which may be used to couple computing system 1500 to other computer systems, networks, and devices.

In an embodiment, computing system 1500 may include one or more output devices 1508, coupled to processor 1502, to facilitate displaying graphics and text. Output devices 1508 may include, but are not limited to, a display, LCD screen, CRT monitor, printer, touch screen, or other device for displaying information. Computing system 1500 may also include a graphics adapter (not shown) to assist in displaying information or images on output device 1508.

One or more input devices 1510, coupled to processor 1502, may be used to facilitate user input. Input device 1510 may include, but are not limited to, a pointing device, such as a mouse, trackball, or touchpad, and may also include a keyboard or keypad to input data or instructions into computing system 1500.

In an embodiment, computing system 1500 may receive input, whether through communications port 1514, network interface 1512, stored data in memory 1504/1506, or through an input device 1510, from a scanner, copier, facsimile machine, or other computing device.

In embodiments, computing system 1500 may include one or more databases, some of which may store data used and/or generated by programs or applications. In embodiments, one or more databases may be located on one or more storage devices 1504 resident within a computing system 1500. In alternate embodiments, one or more databases may be remote (i.e., not local to the computing system 1500) and share a network 1516 connection with the computing system 1500 via its network interface 1514. In various embodiments, a database may be a relational database, such as an Oracle database, that is adapted to store, update, and retrieve data in response to SQL-formatted commands.

One skilled in the art will recognize no computing system or programming language is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A non-transitory computer-readable storage medium encoded with a data structure configured to represent a time-related profile of a resource as a hierarchy, the data structure comprising:
    an ordered set of nodes forming a hierarchy of temporal levels, wherein a temporal level comprises a set of nodes from the ordered set of nodes having a similar or same magnitude temporal span;
    each of at least some of the nodes from the ordered set of nodes comprises a set of data fields for storing profile-related data, at least one being a time span indicator, and up to four links comprising:
    a link to a temporally-immediate prior same-level node;
    a link to a temporally-immediate subsequent same-level node;
    a link to a next higher temporal level node having a time span that includes the node's time span; and
    a link to a next lower temporal level node having a time span that is included within the time span of the node; and
    wherein the set of data fields for storing profile-related data for at least some of the nodes from the ordered set of nodes that form a lowest temporal level comprises one or more resource values;
    wherein the set of profile-related data of a node comprises a maximum resource value representing a maximum cumulative change value of the resource within the time span of the node, a minimum resource value representing a minimum cumulative change value of the resource within the time span of the node, and a base resource value representing an initial value of the resource at the start of the time span of the node;
    wherein a change in the base resource value is propagated to the temporally-immediate subsequent same-level node and to the next higher temporal level node having a time span that includes the node's time span; and
    wherein a change in the maximum resource value and/or the minimum resource value is propagated to the next higher temporal level node having a time span that includes the node's time span and is not propagated to the temporally-immediate subsequent same-level node.

2. The computer readable medium of claim 1 the one or more resource values of the at least some of the nodes from the ordered set of nodes that form a lowest temporal level comprises a resource change value and a time value associated with the resource change value.

3. The computer readable medium of claim 2 the set of data fields for storing profile-related data for at least some of the nodes from the ordered set of nodes that form a lowest temporal level further comprises one or more data values representing cumulative resource changes during the time span of the node.

4. The computer readable medium of claim 1 wherein only one node of a set of nodes at a temporal level that are within a time span of a next higher temporal level node comprises a link to the next higher temporal level node.

5. The computer readable medium of claim 1 wherein the profile is a bucketed resource profile representing capacities of the resource for spans of time and the set of data fields for storing profile-related data for at least some of the nodes from the ordered set of nodes that form a lowest temporal level further comprises at least one data value representing a boundary of a span of time.

6. The computer readable medium of claim 5 wherein the boundary represents a start boundary or an end boundary.

7. A computer program product comprising at least one non-transitory computer-readable storage medium storing one or more sequences of instructions, wherein execution of the one or more sequences of instructions by one or more processors causes the one or more processors to change a time-related profile of a resource given a resource change value associated with a time value, the time-related profile comprising:
    an ordered set of nodes forming a hierarchy of temporal levels, wherein a temporal level comprises a set of nodes from the ordered set of nodes having a similar or same magnitude temporal span;
    each of at least some of the nodes from the ordered set of nodes comprises a set of data fields for storing profile-related data, at least one a time span indicator, and up to four links comprising: a link to a temporally-immediate prior same-level node; a link to a temporally-immediate subsequent same-level node; a link to a next higher temporal level node having a time span that includes the node's time span; and a link to a next lower temporal level node having a time span that is included within the node's time span;
    the set of data fields for storing profile-related data comprising a maximum resource value representing a maximum cumulative change value of the resource within the time span of the node, a minimum resource value representing a minimum cumulative change value of the resource within the time span of the node, and a base resource value representing an initial value of the resource at the start of the time span of the node; and
    the set of data fields for storing profile-related data for at least some of the nodes from the ordered set of nodes that form a lowest temporal level comprising one or more resource values,
the one or more sequences of instructions comprising:
    for each node at a temporal level in which the time value is before the time span of the node, updating the base resource value of the node by adding the resource change value to the base resource value of the node;
    identifying a lowest level node that has a time span that includes the time value associated with the resource change value;
    entering the resource change value in the identified lowest level node;
    responsive to the resource change value causing the identified lowest level node to have a different maximum resource value or different minimum resource value, updating the node's maximum resource value or minimum resource value; and
    responsive to an update to the maximum resource value or the minimum resource value of the identified lowest level node, updating the maximum resource value or the minimum resource value of each higher temporal level node that has a time span that includes the time span of the identified lowest level node and that has a value that requires updating based upon the update to the maximum resource value or the minimum resource value of the identified lowest level node.

8. The computer program product of claim 7 wherein a node of a higher temporal level spans a larger time span than a node from a lower temporal level.

9. The computer program product of claim 7 wherein the step of identifying a lowest level node that has a time span that includes the time value associated with the resource change value comprises:
    [a] setting the examination temporal level to the highest temporal level;

[b] examining the time span of the nodes at the examination temporal level to identify a node that has a time span that includes the time value;

[c] responsive to identify a node that has a time span that includes the time value and responsive to the examination temporal level not being the lowest temporal level, setting the examination temporal level as the next lower temporal level; and

[d] returning to step [b].

10. The computer program product of claim 9 further comprising:

responsive to no lowest temporal level node having a time span that includes the time value associated with the resource change value, inserting a lowest level node having a time span that includes the time value.

11. The computer program product of claim 10 wherein the step of inserting a lowest level node having a time span that includes the time value comprises:

inserting a lowest level node, the insert lowest level node comprising at least one a time span indicator, and up to three links comprising: a link to a temporally-immediate prior same-level node; a link to a temporally-immediate subsequent same-level node; and a link to a next higher temporal level node having a time span that includes the node's time span; and setting a base resource value of the inserted lowest level node to be equal to the base resource value of the temporally-immediate subsequent lowest level node.

12. A computer program product comprising at least one non-transitory computer-readable storage medium storing one or more sequences of instructions, wherein execution of the one or more sequences of instructions by one or more processors causes the one or more processors to change a time-related profile of a resource given a resource change value associated with a time value, the time-related profile including an ordered set of nodes forming a hierarchy of temporal levels, wherein a temporal level comprises a set of nodes from the ordered set of nodes having a similar or same magnitude temporal span;

wherein each of at least some of the nodes from the ordered set of nodes includes a set of data fields for storing profile-related data, at least one a time span indicator, and up to four links comprising: a link to a temporally-immediate prior same-level node, a link to a temporally-immediate subsequent same-level node, a link to a next higher temporal level node having a time span that includes the node's time span, and a link to a next lower temporal level node having a time span that is included within the node's time span;

the set of data fields for storing profile-related data comprising a maximum resource value representing a maximum cumulative change value of the resource within the time span of the node, a minimum resource value representing a minimum cumulative change value of the resource within the time span of the node, and a base resource value representing an initial value of the resource at the start of the time span of the node; and the set of data fields for storing profile-related data for at least some of the nodes from the ordered set of nodes that form a lowest temporal level comprising one or more resource values;

the one or more sequences of instructions comprising:

for each node at a temporal level in which the time value is before the time span of the node, updating the base resource value of the node by adding the resource change value to the base resource value of the node;

identifying a lowest level node that has a time span that includes the time value associated with the resource change value;

wherein identifying a lowest level node that has a time span that includes the time value associated with the resource change value includes (a) setting the examination temporal level to the highest temporal level, (b) examining the time span of the nodes at the examination temporal level to identify a node that has a time span that includes the time value, (c) responsive to identify a node that has a time span that includes the time value and responsive to the examination temporal level not being the lowest temporal level, setting the examination temporal level as the next lower temporal level, (d) responsive to no lowest temporal level node having a time span that includes the time value associated with the resource change value, inserting a lowest level node having a time span that includes the time value, and (e) returning to step (b);

entering the resource change value in the identified lowest level node;

responsive to the resource change value causing the identified lowest level node to have a different maximum resource value or different minimum resource value, updating the node's maximum resource value or minimum resource value;

responsive to an update to the maximum resource value or the minimum resource value of the identified lowest level node, updating the maximum resource value or the minimum resource value of each higher temporal level node that has a time span that includes the time span of the identified lowest level node and that has a value that requires updating based upon the update to the maximum resource value or the minimum resource value of the identified lowest level node; and responsive to the lowest level node to be inserted not having a higher temporal level node at one or more temporal levels with a time span that includes the time value, inserting a higher temporal level node with a time span that includes the time value at each temporal level that did not have such a higher temporal level node.

13. The computer program product of claim 12 wherein the step of inserting a higher temporal level node comprises:

setting a base resource value of the inserted higher level node to be equal to the base resource value of a temporally-immediate subsequent same-level node.

* * * * *

UNITED STATES PATENT AND TRADEMARK OFFICE
CERTIFICATE OF CORRECTION

PATENT NO. : 8,335,803 B2
APPLICATION NO. : 12/834752
DATED : December 18, 2012
INVENTOR(S) : Abraham It is certified that error appears in the above-identified patent and that said Letters Patent is hereby corrected as shown below:

In column 1, line 8, before "commonly" delete "and".

In column 7, line 12, delete "implementation" and insert -- implementation. --, therefor.

In column 7, line 47, delete "starKey=start" and insert -- startKey=start --, therefor.

Signed and Sealed this
Twelfth Day of March, 2013

Teresa Stanek Rea
*Acting Director of the United States Patent and Trademark Office*